United States Patent [19]
Phillips

[11] 4,383,416
[45] May 17, 1983

[54] ABSORPTION HEATING SYSTEM WITH IMPROVED LIQUID FLOW CONTROL

[75] Inventor: Benjamin A. Phillips, Benton Harbor, Mich.

[73] Assignee: Allied Corporation, Morris Township, Morris County, N.J.

[21] Appl. No.: 221,137

[22] Filed: Dec. 29, 1980

[51] Int. Cl.³ ............................................. F25B 15/00
[52] U.S. Cl. ..................................... 62/101; 62/141; 62/476
[58] Field of Search ................. 62/476, 489, 142, 485, 62/495, 101, 141

[56] References Cited

U.S. PATENT DOCUMENTS

| | | | |
|---|---|---|---|
| 2,193,535 | 3/1940 | Maiuri | 62/101 |
| 2,918,807 | 12/1959 | Leonard, Jr. | 62/476 |
| 2,979,923 | 4/1961 | Bury | 62/476 |
| 3,273,350 | 9/1966 | Taylor | 62/101 |
| 3,314,246 | 4/1967 | Hopkins et al. | 62/476 X |
| 3,407,625 | 10/1968 | McDonald | 62/476 |
| 3,426,548 | 2/1969 | Greacen et al. | 62/476 X |
| 3,527,060 | 9/1970 | Kruggel | 62/476 X |
| 3,527,061 | 9/1970 | Kruggel | 62/142 |
| 3,638,452 | 2/1972 | Kruggel | 62/485 |
| 4,106,309 | 8/1978 | Phillips | 62/476 |
| 4,127,009 | 11/1978 | Phillips | 62/476 X |
| 4,127,010 | 11/1978 | Phillips | 62/476 X |
| 4,127,993 | 12/1978 | Phillips | 62/476 X |
| 4,209,364 | 6/1980 | Rothschild | 62/101 X |

*Primary Examiner*—Lloyd L. King
*Attorney, Agent, or Firm*—Arthur J. Plantamura; Alan M. Doernberg; Jay P. Friedenson

[57] ABSTRACT

An absorption refrigeration system in which the liquid flow control element is a variably-sized restriction which increases in size to increase the flow of absorbent from the generator to the absorber in response to decreases in the low-side pressure of the absorber and evaporator, and which decreases in size to decrease the flow of absorbent in response to increases in low-side pressure.

6 Claims, 2 Drawing Figures

ABSORPTION HEATING SYSTEM WITH IMPROVED LIQUID FLOW CONTROL

BACKGROUND OF THE INVENTION

Absorption refrigeration systems are well known for large and small scale cooling, including air conditioning, utilizing an absorption pair of a volatile refrigerant such as ammonia or various fluorocarbons and a liquid absorbent. Representative absorption pairs are ammonia (as refrigerant) and water (as absorbent), water (as refrigerant) and lithium bromide (as absorbent) and dichloromonofluoromethane (as refrigerant) and the dimethylether of tetraethylene glycol (as absorbent). Refrigeration with such systems depends upon withdrawing heat into the refrigerant in an evaporator.

Absorption systems have been suggested for heating applications as well, wherein the evaporator is used to withdraw heat from a heat source such as outside air. The heat outputs of the absorption system, principally the absorber and the condenser, are then used to provide heat for space heating. U.S. Pat. Nos. 3,527,060, 3,527,061 and 3,638,452, all to Kruggel, are representative of such systems based upon the use of ammonia and water. U.S. Pat. Nos. 4,106,309, 4,127,009, 4,127,010 and 4,127,993, all to Phillips, describe an absorption heat pump system, particularly for use with fluorocarbon refrigerants and furan-derivative absorbents. Particular attention is drawn to FIGS. 4, 5 and 6 of U.S. Pat. No. 4,127,010, which illustrate the different pressure and temperature conditions of the absorption refrigeration cycle when the ambient air is approximately 47° F. (8° C.) and 0° F. (−18° C.) in the heating mode and 95° F. (35° C.) in the cooling mode. In particular, as cold ambient air conditions are encountered, the evaporator temperature and the low side pressure in the evaporator and absorber drop, the refrigerant content of both the rich liquor leaving the absorber and the weak liquor returning to the absorber decrease and the peak boiler temperature in the generator increases. While these variations assist in adapting the absorption system to such cold ambient conditions, it has now been found that even with such adjustments, difficulties can arise under cold ambient conditions. In particular, the heating capacity of the absorption system falls off as ambient conditions get colder, while at the same time, the weak liquor at the hottest part of the boiler may become excessively hot. Because, in general, less heat may be taken into the absorption system through the evaporator from cold ambient air, it would be desirable to increase the heat input into the system from the boiler.

BRIEF DESCRIPTION OF THE INVENTION

The present invention relates to an improvement in an absorption refrigeration system having a generator, an absorber, a condenser, an evaporator, a liquid flow control element, a refrigerant flow control element and a solution pump, operatively connected to extract heat into a refrigerant at a low pressure in the evaporator, to reject heat from the refrigerant at a high pressure in the condenser, to absorb refrigerant into an absorbent and reject heat at the low pressure in the absorber and to distill refrigerant from the absorbent in the generator. In the improvement, the liquid flow control element comprises a variably-sized restriction and means for opening the restriction to increase the flow of absorbent into the absorber in response to decreases in the low pressure and for closing the restriction to decrease the flow of absorbent into the absorber in response to increases in the low pressure.

The present invention also comprises a method of absorption heating of the type wherein heat is rejected from a condensing refrigerant at a high pressure, the condensed refrigerant is expanded to a low pressure, heat is absorbed into an evaporating refrigerant at the low pressure, the evaporated refrigerant is absorbed into an absorbent at the low pressure, the solution formed by absorbing the refrigerant into the absorbent is pumped to a high pressure, the refrigerant is distilled from the solution at the high pressure and returned to the condensing step, and the absorbent solution remaining after distillation is returned to the low pressure to absorb additional evaporated refrigerant. In the improvement, the absorbent solution flow to the low pressure is controlled through a variably sized flow restriction, and the method further comprises increasing the size of the restriction to increase the flow of absorbent in response to decreases in the low pressure and decreasing the size of the restriction to decrease the flow of absorbent in response to increases in the low pressure.

DETAILED DESCRIPTION OF THE INVENTION

The present invention is applicable to absorption heat pumps of the type described in the above Phillips patents as well as in the above Kruggel patents and in other such absorption heat pumps. Thus, for example, the present invention is not restricted to systems having a unitary absorber/absorption heat exchanger, but may also be used in systems having a separate absorber and absorber heat exchanger. Furthermore, the evaporator of the system may be air heated, and thus in direct contact with the heat source from which heat is drawn in the heating mode. Alternatively, as described in the above patents, the evaporator may be in heat exchange relation with a heat transfer fluid such as water-glycol, which acts as a cold coolant path; and the absorber and condenser may be in heat exchange relation with a heated coolant fluid such as glycol-water. While the present invention is designed to resolve problems presented primarily in the heating mode, it is also applicable to heat pumps such as those shown in the above patents which are capable of operation in both the heating and cooling modes.

The present invention is particularly applicable to refrigerants such as 1-chloro-2,2,2-trifluoroethane or refrigerant 133a, which has a relatively low vapor pressure at most evaporator conditions. With systems using refrigerant 133a, the high side pressure typically is between 3 and 5 atmospheres absolute while the low side pressure typically varies between 1/5 and 1 atmosphere. The variations in low side pressure are generally determined by the evaporator which must operate at a temperature lower than that of ambient air if heat is to be extracted directly or indirectly from ambient air.

While the invention is especially suitable for low pressure refrigerants like fluorocarbon 133a, the invention may also be used with somewhat lower pressure refrigerants such as chlorodifluoromethane (fluorocarbon 21) or with higher pressure refrigerants such as ammonia. In general, the use of water as a refrigerant is not preferred since, under cold ambient conditions in which the problems resolved by the present invention are typically encountered, water would freeze in the evaporator.

DESCRIPTION OF THE PREFERRED EMBODIMENTS

Figure 1:
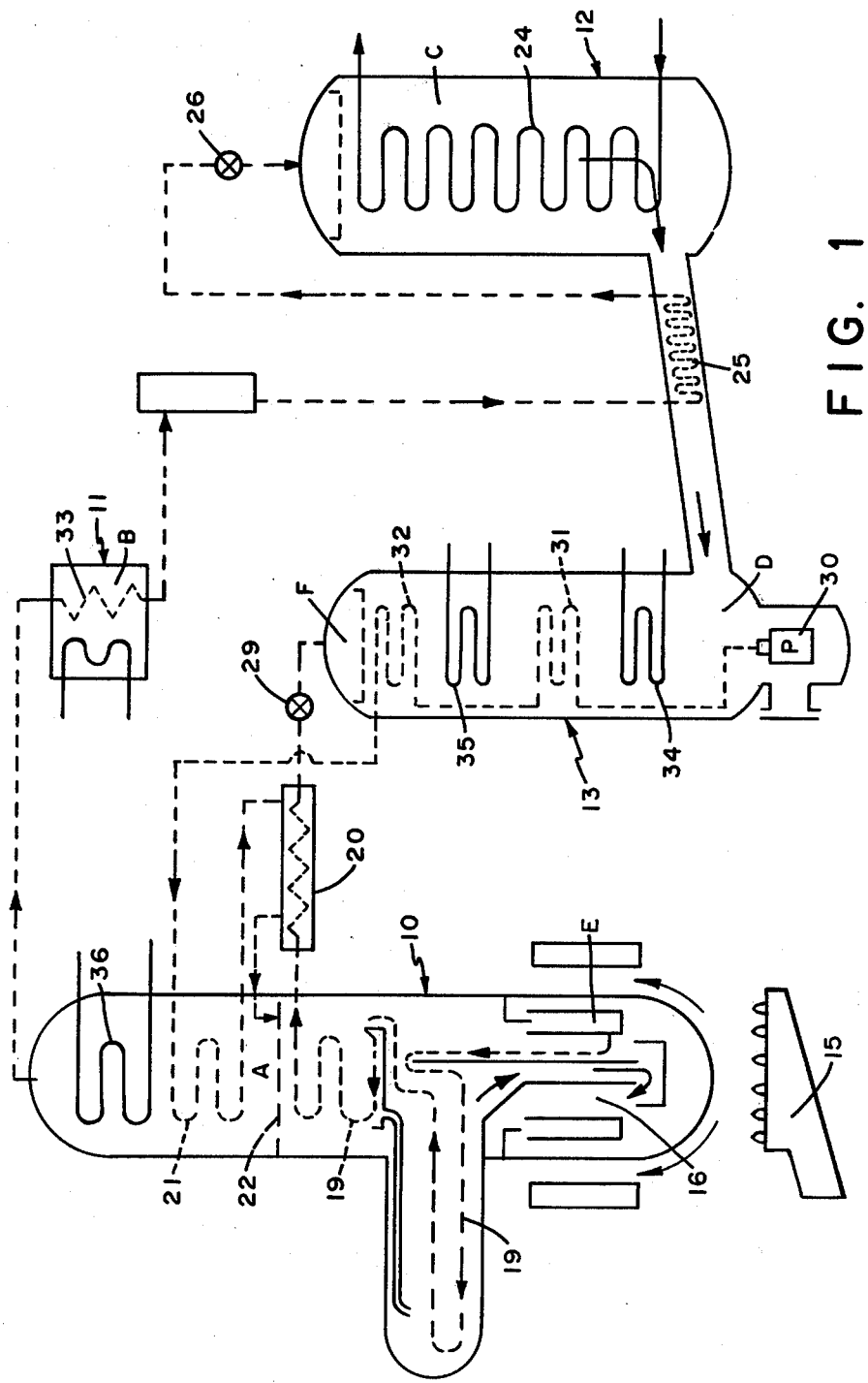

FIG. 1 shows schematically an absorption heat pump system similar in general design to that described in the above Phillips patents. The working fluid paths are shown in some detail, but the coolant paths are shown only with respect to those heat exchange elements which withdraw heat from the working fluids or impart heat to the working fluids. The connections of these coolant paths to each other and to various external heat sources or sinks or the space to be heated or cooled are described only generally below. Further illustration of suitable connections is provided in U.S. Pat. No. 4,127,010. The present invention is not, however, limited to such combination of connections but can be used in systems with the various heated coolant coils connected in various ways to the space to be heated and the chilled water coil in the evaporator connected to ambient air in various ways. In addition, in place of the chilled water coil 24 in the evaporator 12 shown in FIG. 1, a direct air chilling evaporator may be used.

Thus, with reference to FIG. 1, the basic components of the absorption heat pump system are shown: the generator 10, the condenser 11, the evaporator 12 and the absorber 13. Letters A through F in FIG. 1 correspond to the points on the graphs of FIGS. 4, 5, and 6 of U.S. Pat. No. 4,127,010. An external heat source such as ring burner 15 is provided below the generator to distill absorbent solution high in refrigerant (called the rich liquor) in the lower or boiler portion 16 of the generator 10. Details of a suitable boiler section 16 are described in U.S. Pat. No. 4,127,993. In general, flue gases rising from burner 15 heat the wall of the generator. The refrigerant vapor rises upward in the generator 10 as described further below. The absorbent solution weak in refrigerant (the weak liquor in an annular space E) is drawn through weak liquor or analyzer coils 19 through a liquid heat exchanger 20 and then to liquid flow control element 29 described further below. Rich liquor from the absorber 13 passes through rectifier coil 21 in the upper portion of the generator, then through liquid heat exchanger 20 and into a middle portion of the generator 10 where it is distributed by distributor plate 22 over analyzer coils 19. As described more fully in U.S. Pat. No. 4,106,309, the analyzer coils 19 serve to preheat this rich liquor (which has previously been heated in the liquid heat exchanger 20) evaporating some of it, before final boiling in the boiler section 16. The refrigerant vapor is stripped of absorbent vapor by the relatively cool, rich liquor in rectifier coil 21. From there, or after further stripping with a reflux coil 36, the refrigerant passes out the top of the generator to the condenser 11. In the condenser 11, by heat exchange with coolant in coil 33, the refrigerant releases heat and condenses to a liquid, still at the high pressure (with some small pressure drop occurring through the condenser). It then passes through precooler 25 where it is cooled, expanded in refrigerant expansion element 26 to a low pressure and released into evaporator 12 where it evaporates at the low pressure withdrawing heat from coolant in evaporator coil 24. The evaporated refrigerant then passes from the base of evaporator 12 through precooler 25 (where it withdraws heat from the condensed refrigerant coming from the condenser 11) and into the base of the absorber 13.

The flow of weak liquor from analyzer coil 19, cooled in liquid heat exchanger 20, is regulated in its flow to the lower pressure of the evaporator 12 and absorber 13 in a liquid flow control element 29, described below. It then passes into the top of absorber 13 over a series of coils where it absorbs refrigerant vapor entering from the base of the absorber and increasingly concentrates. The heat released by this absorption is imparted to coolant and rich liquor in various coils such as the illustrated rich liquor coils 31 and 32 and the illustrated coolant coils 34 and 35. Instead of stacked coils 31, 32, 34 and 35, a series of concentric helical coils may be used, extending the entire height of absorber 13. The rich liquor collects at the base of the absorber and is pumped by pump 30 back through rich liquor coils 31 and 32 where it is preheated, then to rectifier coil 21 where it is further heated, then through liquid heat exchanger 20 where it is further heated and back into the generator 10, and over distributor plate 22.

It should be appreciated that the low pressure of evaporator 12 and absorber 13 is determined primarily by the evaporation temperature in evaporator 12, which depends on the temperature of coolant in coil 24. Since, in the heating mode, coil 24 is usually connected to an outside heat exchanger in exchange with ambient air, as ambient air gets colder, the low side pressure drops. The high side pressure, which is relatively constant, depends primarily upon the temperature of coolant in coil 33. Since coil 33 is normally fixed in its relationship to one or more of coils 34, 35 and 36 and the return water from the heated space in the heated coolant path, and since these coils and return water are not subject to sharp variations in temperature, the high side pressure is likely to remain relatively constant.

The flow of liquid and absorbent solution is controlled by liquid flow control element 29 and solution pump 30. So long as the pump maintains sufficient solution in the generator 10 and so long as some significant pressure differential exists between the generator 10 and the absorber 13, weak liquor can flow from the generator 10 to the absorber 13 at any rate permitted by the liquid flow control element 29. Conventionally, the flow control element 29 is a fixed restriction, such as a capillary, that provides a relatively constant flow of liquid subject only to slight variations based upon the pressure differential between the generator 10 and the absorber 13. It has been found that system performance at low ambient temperatures can be improved substantially by increasing the circulation rate of the absorbent solution above the rate optimal for performance at higher ambient temperatures.

Accordingly, in this invention, flow control element 29 is designed as a variable flow restricter opening in response to decreases in low side pressure and closing or reducing flow in response to increases in low side pressure. The simplest means of achieving this control is to use as liquid flow control element 29 a valve designed similarly to the so called "constant pressure valve" or "automatic expansion valve" of the type sometimes used for refrigerant expansion in compression refrigeration systems. Such valves balance a relatively fixed force (e.g., a spring force) against an internal or external pressure to open or close a valve opening. Such a valve is shown and described on page 210 of the 1972 Guide And Data Book published by the American Society of Heating, Refrigeration and Air Conditioning Engineers (ASHRAE) and is commercially available from several sources, such as Sporlan Valve Company, Alco Controls Division of Emerson Electric, Singer Company Controls Division and others.

Figure 2:
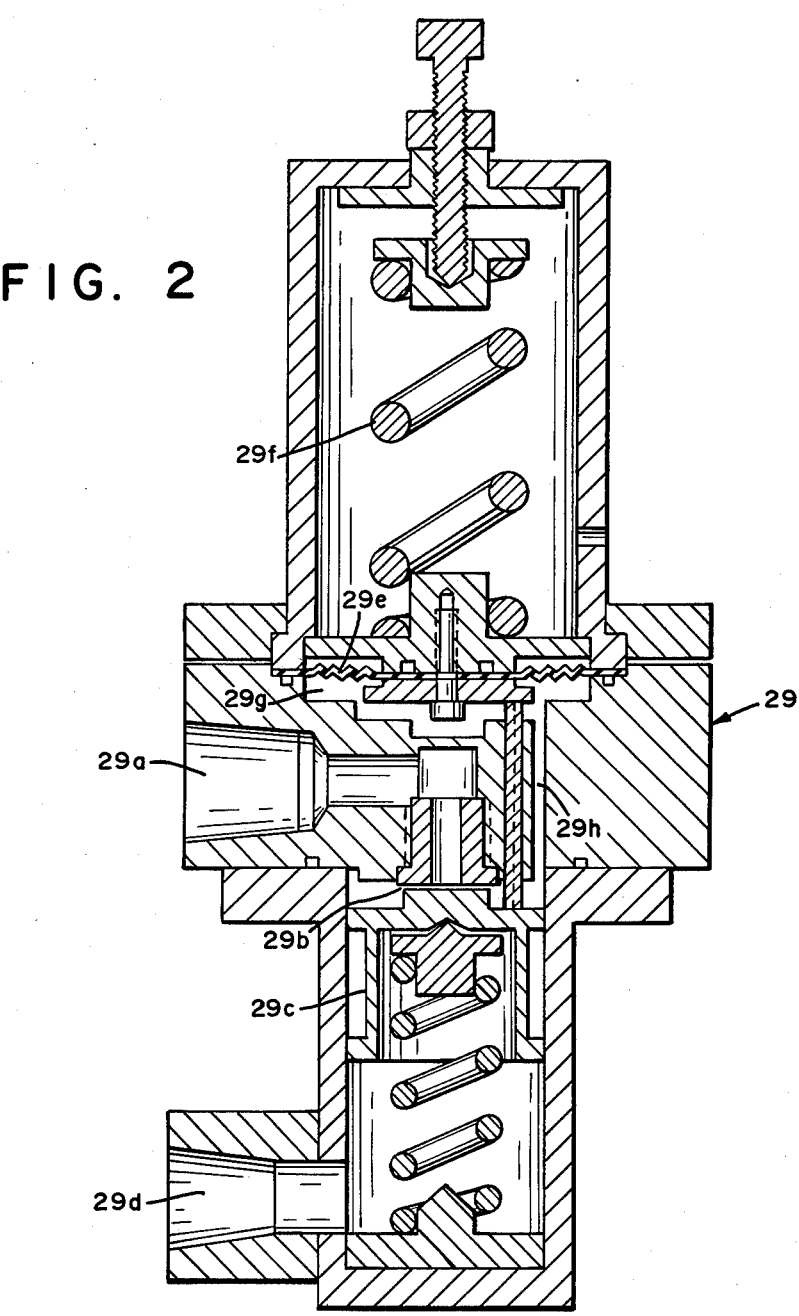

Such a flow control 29 is illustrated in FIG. 2 including an inlet 29a, a valve opening 29b, a valve stem 29c regulating the size of the valve opening 29b and an outlet 29d. The inlet is connected to generator 10, the outlet to absorber 13. The valve stem 29c is moved upward (opening valve opening 29b) or downward (closing valve opening 29b) by a diaphragm 29e having a spring 29f on the top side and a space 29g on the bottom side connected through an internal equalizer passage 29h with the outlet 29d. When used for liquid flow control, a valve of that general type is not intended to achieve a constant low side pressure as it does when controlling the flashing refrigerant, but rather to control the flow rate of weak solution as an inverse function of the varying low side pressure. The low-side pressure, acting through space 29g on the diaphragm 29e against the spring force, moves the diaphragm upward when it increases, and allows the spring 29f to move the diaphragm downward when it decreases. The diaphragm movement in turn increases the valve opening 29b as the low-side pressure drops and reduces the valve opening 29b as the low-side pressure increases. The valve opening 29b, spring 29f and diaphragm 29e are sized so that the weak liquid flow rates follow closely the the optimum solution flow rates of the fluid pair over the operating conditions that match the range of temperatures of the heat source.

For any fluid pair, the optimum solution flow rate at a given ambient temperature is a function of the high-side and low-side pressures, the absorber outlet temperature, the peak boiler temperature, the heat input to the boiler, the vapor pressure charactertistics of the fluid pair and the basic heat pump design. Most of these factors are either fixed by design or are intended to vary only to a limited extent in a pre-established manner. Of these, only the low-side pressure has a direct relationship to the temperature of the heat source. It therefore serves as a primary basis for control of the solution flow in this invention. The low-side pressure can be readily applied to the diaphragm surface either by means of an internal equalizer passage in the valve or by an external equalizing connection.

In this invention, this type of valve, in which the low-side pressure acts against a spring to modulate the valve opening, is proposed as a direct, low cost means of controlling the solution circulating rate to a close approximation of the optimum flow rates. The temperature of the heat source, of the chilled coolant, or of the evaporator itself, can also serve as a satisfactory basis for control. Valves which modulate flow in response to temperature can therefore also be use in this context. To follow the optimum flow rates more closely, valves actuated by either pressure or temperature can also be programmed by electronic means, or otherwise, to approximate the optimum flow to any desired accuracy.

The present invention is not, however, limited to the preferred embodiments described above, but is rather intended to encompass various modifications within the broad scope described in the claims that follow.

What is claimed is:

1. In an absorption refrigeration system having a generator, an absorber, a condenser, an evaporator, a liquid flow control element, a refrigerant flow control element and a solution pump, operatively connected to extract heat into a refrigerant at a low pressure in the evaporator, to reject heat from the refrigerant at a high pressure in the condenser, to absorb refrigerant into an absorbent and reject heat at the low pressure in the absorber and to distill refrigerant from the absorbent in the generator; the improvement wherein the liquid flow control element comprises a variably-sized restriction and means for opening the restriction to increase the flow of absorbent into the absorber in response to decreases in the low pressure and for closing the restriction to decrease the flow of absorbent into the absorber in response to increases in the low pressure.

2. The absorption system of claim 1 wherein the liquid expansion element comprises a valve having a movable portion responsive to absorber pressure directing the valve toward an closed position and a counterbalancing force directing the valve toward a open position.

3. The absorption refrigeration system of claim 2 wherein the liquid expansion element further comprises internal equalizer means for equalizing the pressure of liquid immediately downstream of the valve with a pressure exerted directly on the valve movable portion toward the open position.

4. In a method of absorption heating wherein heat is rejected from a condensing refrigerant at a high pressure, the condensed refrigerant is expanded to a low pressure, heat is absorbed into an evaporating refrigerant at the low pressure, the evaporated refrigerant is absorbed into an absorbent solution at the low pressure, the solution formed by absorbing the refrigerant into the absorbent is pumped to a high pressure, the refrigerant is distilled from the solution at the high pressure and returned to the condensing step, and the absorbent remaining after distillation is returned to the low pressure to absorb additional evaporated refrigerant;

the improvement wherein the absorbent solution flow to the lower pressure is controlled through a variably sized flow restriction, and the method further comprises:

increasing the size of the restriction to increase the flow of absorbent in response to decreases in the low pressure, and decreasing the size of the restriction to decrease the flow of absorbent in response to increases in the low pressure.

5. The method of claim 4 wherein the size of the restriction is controlled by balancing the absorption pressure against a countervailing force.

6. The method of claim 5 wherein the countervailing force is a spring force.

* * * * *